United States Patent
Lu et al.

(10) Patent No.: US 7,592,777 B2
(45) Date of Patent: Sep. 22, 2009

(54) CURRENT MODE BATTERY CHARGER CONTROLLER

(75) Inventors: Chun Lu, San Jose, CA (US); You-Yuh Shyr, San Jose, CA (US); Alexandru Hartular, San Jose, CA (US); Constantin Bucur, Santa Clara, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 43 days.

(21) Appl. No.: 11/283,087

(22) Filed: Nov. 18, 2005

(65) Prior Publication Data

US 2006/0232241 A1 Oct. 19, 2006

Related U.S. Application Data

(60) Provisional application No. 60/671,754, filed on Apr. 15, 2005.

(51) Int. Cl.
*H02J 7/16* (2006.01)
(52) U.S. Cl. .................. 320/141; 320/134; 320/162
(58) Field of Classification Search .............. 320/134, 320/140, 141, 148, 149, 160, 162; 324/426
See application file for complete search history.

(56) References Cited

U.S. PATENT DOCUMENTS

| | | | |
|---|---|---|---|
| 4,618,832 A * | 10/1986 | Schenck | 330/254 |
| 4,746,852 A * | 5/1988 | Martin | 320/106 |
| 6,163,136 A | 12/2000 | Celenza | |
| 6,351,110 B1 * | 2/2002 | Pappalardo et al. | 323/285 |
| 6,498,461 B1 | 12/2002 | Bucur | |
| 7,190,171 B2 * | 3/2007 | Kawakami et al. | 324/430 |
| 2003/0067283 A1 * | 4/2003 | Takimoto et al. | 320/162 |

OTHER PUBLICATIONS

English translation of Chinese Office Action issued in corresponding Chinese Application No. 2006100721354 dated Jun. 8, 2007 (3 pages).
English translation of Chinese Office Action issued in corresponding Chinese Application No. 2006100721354 dated Nov. 23, 2007 (2 pages).
English translation of Taiwanese Office Action issued in corresponding Taiwan Application No. 2006095109695 dated Dec. 14, 2007 (2 pages).

* cited by examiner

*Primary Examiner*—Akm E Ullah
*Assistant Examiner*—Arun Williams
(74) *Attorney, Agent, or Firm*—Grossman, Tucker, Perreault & Pfleger, PLLC (57) ABSTRACT

A current mode charger controller for controlling a DC to DC converter. The current mode charger may include a first error amplifier having an output coupled to a common node. The first error amplifier may be configured to compare a first signal representative of a charging current provided to a rechargeable battery with a maximum charging current and provide a current control signal in response to the comparison. The current mode charger controller may further include an internal compensation network coupled to the common node, and a comparator configured to compare an inductor current signal representative of an inductor current through an inductor of the DC to DC converter with a compensation signal. The need for any external compensation for the current mode charger controller may be eliminated.

8 Claims, 5 Drawing Sheets

FIG. 5

CURRENT MODE BATTERY CHARGER CONTROLLER

CROSS REFERENCE TO RELATED APPLICATIONS

This application claims the benefit of the filing date of U.S. Provisional Application Ser. No. 60/671,754, filed Apr. 15, 2005, the teachings of which are incorporated herein by reference.

FIELD

The present disclosure relates battery chargers and, more particularly, to a current mode stand alone battery charger controller.

BACKGROUND

A wide variety of portable electrical devices are available today including, but not limited to, laptop computers, personal digital assistants, mobile phones, and cordless power tools. These portable electrical devices may utilize a rechargeable battery to facilitate their portable nature. An adapter, e.g., an ACDC or a DCDC adapter, may also be available to supply power to the portable electrical device in an adapter supply mode. The rechargeable battery may be charged in the adapter supply mode. When the rechargeable battery is being charged, a DC to DC converter may accept an input DC voltage from the adapter and provide an output DC voltage and charging current to the rechargeable battery. The DC to DC converter may have one or more switches controlled by a control signal from a charger controller. The charger controller may receive various input signals representative of various power conditions and may provide an output control signal in response thereto to control the DC to DC converter.

The battery charging process may begin with a constant current charge period where the charging current to the battery is constant as the voltage of the battery rises. When the battery voltage rises to an upper voltage threshold, the charging process may enter a constant voltage charging period. These two different periods may be controlled by two different error amplifiers of the charger controller. In addition, a third error amplifier of the charger controller may be utilized to perform automatic adapter current allocation. Automatic adapter current allocation allocates available current from the adapter between a system load of the portable electrical device and the rechargeable battery. The automatic adapter current allocation ensures that the system load takes precedence over charging current to the rechargeable battery so as the system load requirements increase the charging current provided by the DC to DC converter may decrease to allow more current from the adapter to supply the system load.

Conventional loop compensation for the constant current error amplifier, constant voltage error amplifier, and adapter allocation error amplifier may utilize a resistor and capacitor pair (Rc and Cc) for each of the three error amplifiers which are external to the charger controller. This requires three separate pins on the charger controller and three separate external compensating resistor and capacitor pairs coupled to each pin. This results in additional pins, costs, and complexities for each compensating resistor and capacitor pair. Another voltage mode charger controller has each error amplifier coupled to a common node for all the error amplifiers so only one external compensation pin and one external compensating resistor and capacitor pair is necessary. However, this voltage mode charger controller still requires one integrated circuit pin and external compensating resistor and capacitor pair.

Accordingly, there is a need for eliminating such external compensation for a charger controller with its associated costs and complexities for the additional pins on the charger controller and the external compensation components.

BRIEF SUMMARY OF THE INVENTION

According to one aspect of the invention, there is provided a current mode charger controller for controlling a DC to DC converter. The current mode charger controller may include a first error amplifier having an output coupled to a common node. The first error amplifier may be configured to compare a first signal representative of a charging current provided to a rechargeable battery with a maximum charging current and provide a current control signal in response to the comparison. The current mode charger controller may further include an internal compensation network coupled to the common node, and a comparator configured to compare an inductor current signal representative of an inductor current through an inductor of the DC to DC converter with a compensation signal. The compensation signal may be representative of a voltage level at the common node, and wherein the compensation signal is reduced by the current control signal if the charging current is greater than the maximum charging current, wherein a reduction in the compensation signal results in a control signal provided by said current mode battery charger controller to reduce a charging current from the DC to DC controller.

According to another aspect of the invention, there is provided a portable electrical device. The portable electrical device may include a DC to DC converter configured to accept an input DC voltage from an adapter and provide an output DC voltage and charging current to a rechargeable battery. The DC to DC converter may include an inductor. The portable electrical device may further include a current mode battery charger controller to control the DC to DC converter. The current mode charger controller may include a first error amplifier having an output coupled to a common node. The first error amplifier may be configured to compare a first signal representative of a charging current provided to the rechargeable battery with a maximum charging current and provide a current control signal in response to the comparison. The current mode charger controller may further include an internal compensation network coupled to the common node, and a comparator configured to compare an inductor current signal representative of an inductor current through an inductor of the DC to DC converter with a compensation signal. The compensation signal may be representative of a voltage level at the common node, and wherein the compensation signal is reduced by the current control signal if the charging current is greater than the maximum charging current, wherein a reduction in the compensation signal results in a control signal provided by said current mode battery charger controller to reduce a charging current from the DC to DC controller.

According to another aspect of the invention, there is provided a method. The method may include: providing an internal compensation network for a current mode battery charger controller internal to said current mode battery charger controller.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
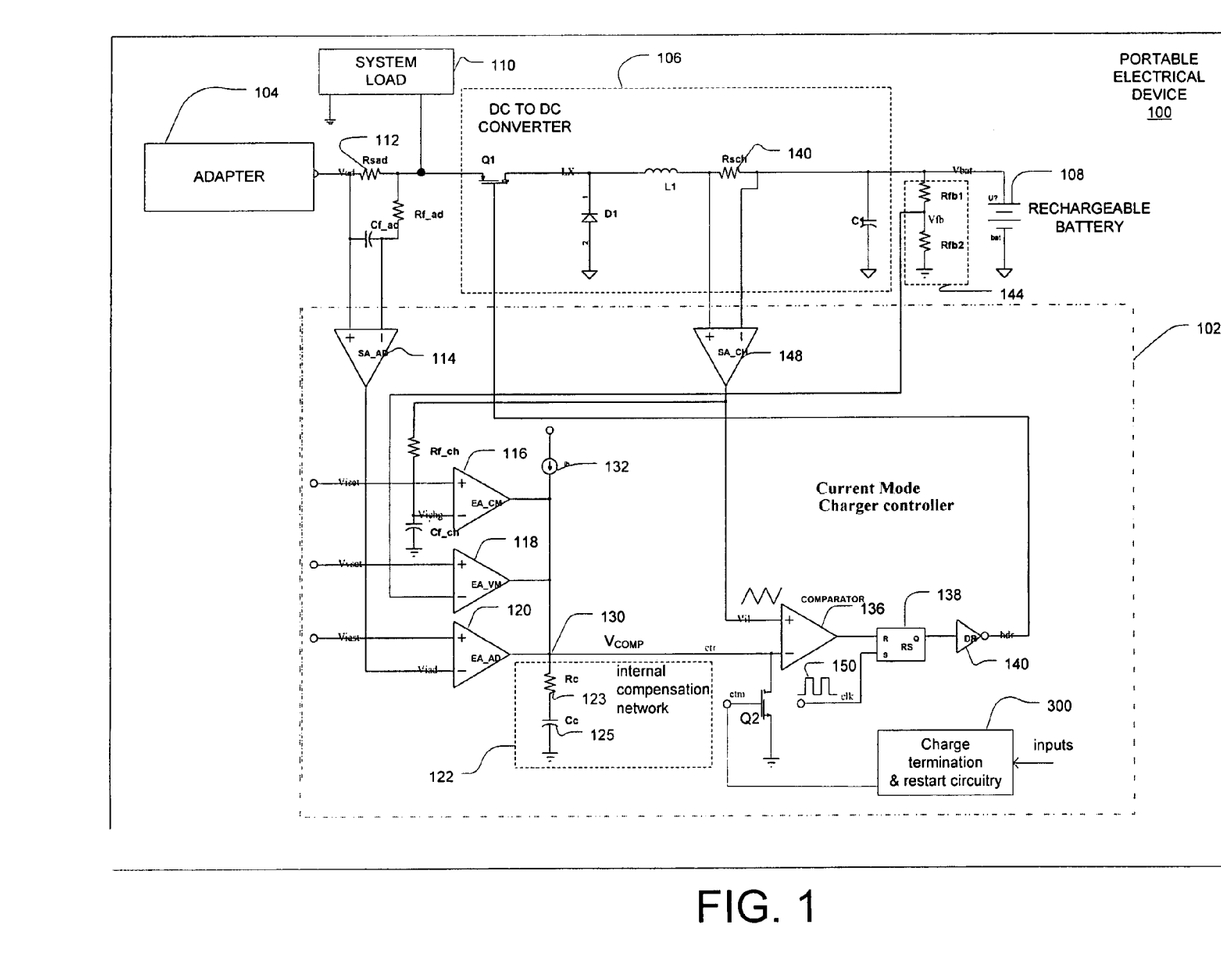
FIG. 1 is a diagram of a portable electrical device including a current mode charger controller consistent with an embodiment.

FIG. 1 is a block diagram of a portable electrical device 100. The portable electrical device 100 may include, but not be limited to, laptop computers, personal digital assistants, mobile phones, and cordless power tools. The portable electrical device 100 may include an adapter 104, a rechargeable battery 108, a DC to DC converter 106, a system load 110, and a stand alone current mode charger controller 102 consistent with an embodiment. The current mode charger controller 102 may implemented as a separate integrated circuit (IC) and may include additional circuitry (not illustrated) to perform additional functions. In general, the current mode charger controller 102 has internal loop compensation provided by the internal compensation network 122. Thus, the current mode charger controller 102 eliminates the need for external compensation including associated IC pins and external compensation components.

The adapter 104 may include an ACDC adapter or a DCDC adapter to supply power to the portable electrical device 100 and/or to provide power to charge the rechargeable battery 108. Although shown internal to the portable electrical device 100, the adapter 104 may also be external to the portable electrical device 100. The rechargeable battery 108 may be of a variety of chemistries including, but not limited to, lithium-ion, nickel-cadmium, and nickel-metal hydride. The rechargeable battery 108 may also be included as part of a rechargeable battery pack.

The DC to DC converter 106 may be a variety of DC to DC converters such as a buck converter. The DC to DC converter 106 may include a high side switch Q1, a diode D1, an inductor L1, and output capacitor C1. The high side switch Q1 is illustrated as a p-channel metal oxide semiconductor field effect transistor (PMOS), although the high side switch Q1 may be implemented as other transistor types or switches.

The current mode charger controller 102 may accept a variety of input signals representative of power conditions of various components and representative of instructions regarding desired charging conditions. In response to these input signals, the current mode charger controller 102 may provide an output control signal hdr to control the DC to DC converter 106. For instance, the current mode charger controller 102 may provide the hdr control signal to the high side switch Q1 to control a state of the switch Q1. If the hdr control signal is a digital zero, then the high switch Q1 may be ON and if the hdr control signal is a digital one, then the high side switch may be OFF.

Some input signals to the current mode charger controller 102 may be provided by sense resistors 112 and 140. Sense resistor 112 may be coupled to the path from the adapter 104 so that the voltage drop across the sense resistor 112 provides a signal proportional to the adapter current from the adapter 104. Sense resistor 140 may be provided within the DC to DC converter 106 and coupled to the inductor L1 so that the voltage drop across the sense resistor 140 provides a signal representative of the inductor current 140 as the inductor current rises and falls with the closing and opening of the high side switch Q1. Another input signal to the current mode charger controller 102 may be provided by the feedback resistor network 144 and may be representative of voltage level of the rechargeable battery 108. The feedback resistor network 144 may include resistors Rfb1 and Rfb2 forming a voltage divider to scale down the battery voltage to a lower feedback voltage Vfb.

The current mode charger controller 102 may include sense amplifiers 114, 148, error amplifiers 116, 118, 120, a current source 132, an internal compensation network 122, a comparator 136, an RS flip flop 138, an inverter 140, and an NMOS transistor Q2. The sense amplifier 148 may amplify the voltage drop across the sense resistor 140 and provide an output signal to the first error amplifier 116. The sense amplifier 114 may amplify the voltage drop across the sense resistor 112 and provide an output signal to the third error amplifier 120. Each error amplifier 116, 118, and 120 may control the duty cycle of the hdr control signal for the constant charging current period, the constant charging voltage period, and for automatic adapter current allocation respectively.

The first error amplifier 116 may compare a signal representative of the battery charging current with a maximum battery charging current (Viset). The output of the first error amplifier 116 may be referred to as a current control signal which may be proportional to the amount the battery charging current exceeds the maximum battery charging current. The current control signal may be zero until the battery charging current exceeds the maximum battery charging current. If the battery charging current exceeds the maximum battery charging current, the error amplifier 116 may generate a current control signal representative of the difference. Since the output of the first error amplifier 116 is coupled to the negative side of the current source 132, any signal generated by the first error amplifier 116 acts to sink current from the current source 132. In turn, this operates to reduce the voltage of the compensation signal ($V_{COMP}$) provided to the inverting input terminal of the comparator 136 since the voltage at the common node 130 is reduced. The voltage at the common node 130 may be dependent on the voltage of the compensation capacitor Cc 125. Therefore, when no current control signal is generated, e.g., battery charging current less than the maximum battery charging current, the current source 132 may charge the compensation capacitor Cc 125 and drive the hdr signal to a maximum duty cycle. When the current control signal is generated, the current source 132 may act as a sink to the compensation capacitor Cc 125, thereby reducing the voltage of the compensation capacitor and hence the compensation signal. A reduction in voltage of the compensation signal then reduces the duty cycle of the hdr control signal to reduce the charging current delivered to the rechargeable battery 108. This first error amplifier 116 therefore effectively controls current during the constant current charging period.

The second error amplifier 118 may compare a signal representative of the battery voltage (Vfb) with a maximum battery voltage (Vvset). The output of the second error amplifier 118 may be referred to as a voltage control signal which may be proportional to the amount the battery voltage exceeds the maximum battery voltage. The voltage control signal may be zero until the battery voltage exceeds the maximum battery voltage. If the battery voltage exceeds the maximum battery voltage, the second error amplifier 118 may generate a voltage control signal representative of the difference. Since the output of the error amplifier 118 is coupled to the negative side of the current source 132 at node 130, any signal generated by the second error amplifier 118 acts to sink current from the current source 132. In turn, this operates to reduce the voltage on the compensating capacitor Cc 125 and the hence to voltage of the compensation signal. The duty cycle of the hdr control signal may then be dynamically adjusted to control battery voltage. This second error amplifier 118 therefore effectively controls battery voltage during the constant voltage charging period.

The third error amplifier 120 may compare a signal representative of adapter current from the adapter 104 with a maximum adapter current. The third error amplifier 120 may reduce the duty cycle of the hdr control signal if the adapter current exceeds the maximum adapter current. This reduces the charging current provided to the rechargeable battery 108 if the adapter needs to deliver more current to the system load 110. Therefore, the third error amplifier 120 provides an automatic adapter current allocation feature to ensure that the system load 110 takes precedence over the charging current provided to the rechargeable battery 108. For example, if the adapter 104 is simultaneously supplying power to the system load 110 and charging current to the rechargeable battery 108 and the system load requires more current, the charging current to the battery 108 may be reduced to meet the demands of the system load 110.

The output of the third error amplifier 120 may be referred to as a power control signal which may be proportional to the amount the adapter current exceeds the maximum adapter current. The power control signal may be zero until the adapter current exceeds the maximum adapter current. If the adapter current exceeds the maximum adapter current, the third error amplifier 120 may generate a power control signal representative of the difference. This indicates the system load 110 is requiring more current and the battery charging current needs to be reduced accordingly. Since the output of the third error amplifier 120 is coupled to the negative side of the current source 132, any signal generated by the third error amplifier 120 acts to sink current from the current source 132. In turn, this operates to reduce the voltage on the compensating capacitor Cc 125 and hence the compensation signal. The duty cycle of the hdr control signal may then be reduced to reduce the charging current provided to the rechargeable battery 108.

The outputs of each error amplifier 116, 118, and 120 may be tied to a common node 130. The current control signal generated by the first error amplifier 116, or the voltage control signal generated by the second error amplifier 118, or the power control signal generated by the third error amplifier 120, whichever is first generated, controls the loop and acts to reduce the voltage of the compensation capacitor Cc 125 and hence the compensation signal to reduce the charging current.

The "current mode" charger controller 102 may sense the inductor current through the inductor L1 of the DC to DC converter 106 from the sense resistor 140 placed within the DC to DC converter 106. In this instance, the inductor current rises and falls with the closing and opening of the high side switch Q1. In contrast, a "voltage mode" charger controller senses charging current via a sense resistor placed outside the DC to DC converter to sense DC current (without ripple). The current mode charger controller 102 has a quick transient response and may be compensated with only one internal compensation network 122 for all three error amplifiers 116, 118, 120. The internal compensation network 122 is internal to the current mode charger controller 102. The internal compensation network 122 may include a compensating resistor Rc 123 in series with the compensation capacitor Cc125.

The current mode charger controller 102 removes one of the poles introduced by the inductor L1, thus relatively small values for the compensating resistor Rc 123 and capacitor Cc 125 are needed to achieve a stable closed loop. In one embodiment, the compensating resistor Rc 123 may be as small as 80 kiloohms and the compensating capacitor Cc 125 may be as small as 40 picofarads. Having such small compensating resistor Rc 123 and compensating capacitor Cc 125 values enables them to be readily integrated as an internal component of the current mode charger controller 102 thus eliminating the need for any external compensating components.

Figure 2:
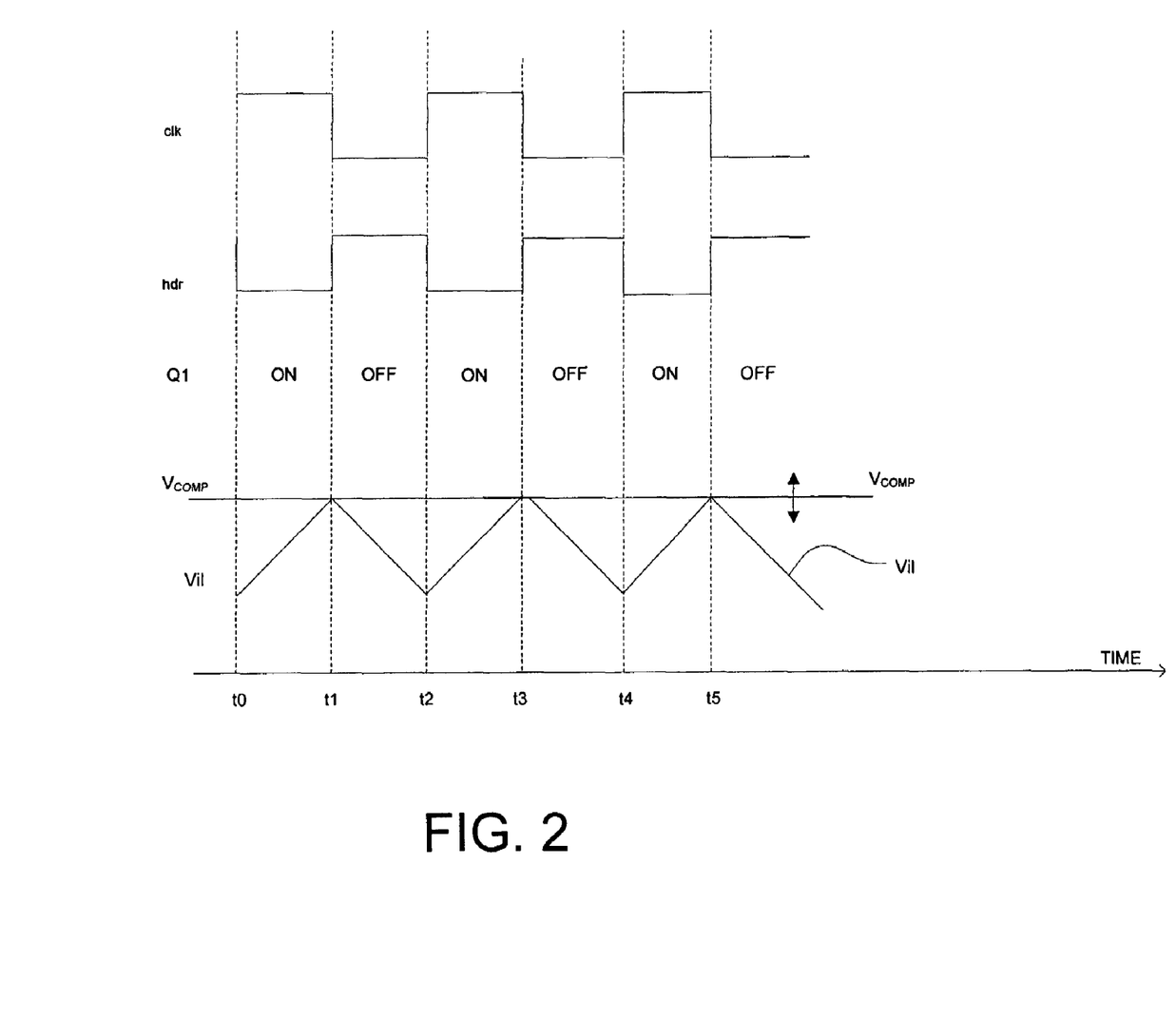
FIG. 2 is a timing diagram illustrating the operation of the current mode charger controller of FIG. 1.

FIG. 2 illustrates a timing diagram to further explain operation of the current mode charger controller 102 of FIG. 1. The clock signal clk may have a fixed frequency and be input to the set terminal of the RS flip flop 138. The hdr control signal represents the output signal provided by the inverter 140 as dependent on the Q output of the RS flip flop 138 to the inverter 140. The high side switch Q1 may be responsive to the hdr control signal to turn ON when hdr is a digital zero and turn OFF when hdr is a digital one. The compensation signal Vcomp represents the voltage at node 130 which may be equal to the voltage of the compensating capacitor Cc 125. The Vil signal represents the inductor current level of the inductor L1 of the DC to DC converter 106. As illustrated, Vil increases when the high side transistor Q1 is ON and Vil decreases when the high side transistor Q1 is OFF.

The comparator 136 may compare the Vil signal representative of the inductor current of the inductor L1 with Vcomp or the voltage level at node 130. The output of the comparator 136 controls the resetting of the RS flip flop 138, while the clock signal clk controls the setting of the RS flip flop 138. As illustrated at times t0, t2, and t4, every time the clock signal clk rises to a digital one, the high side transistor Q1 is turned ON by a low hdr control signal. Accordingly, the current through the inductor L1 increases when the high side transistor Q1 is turned on and therefore so does the Vil signal as illustrated between times t0 and t1, times t2 and t3, and between times t4 and t5. When the Vil signal reaches the potential of the Vcomp signal, e.g., at times t1, t3, and t5, the flip flop 138 is reset which in turn cause the high side transistor Q1 to turn OFF. Accordingly, the value of Vcomp controls the duty cycle of the hdr control signal. If Vcomp is lowered, then the duty cycle of the hdr signal is reduced since Vil takes less time to reach to the potential of Vcomp. In contrast, if Vcomp is increased, the duty cycle of hdr signal is increased since the Vil takes more time to reach the potential of Vcomp.

Charge Termination and Restart Circuitry

Figure 3:
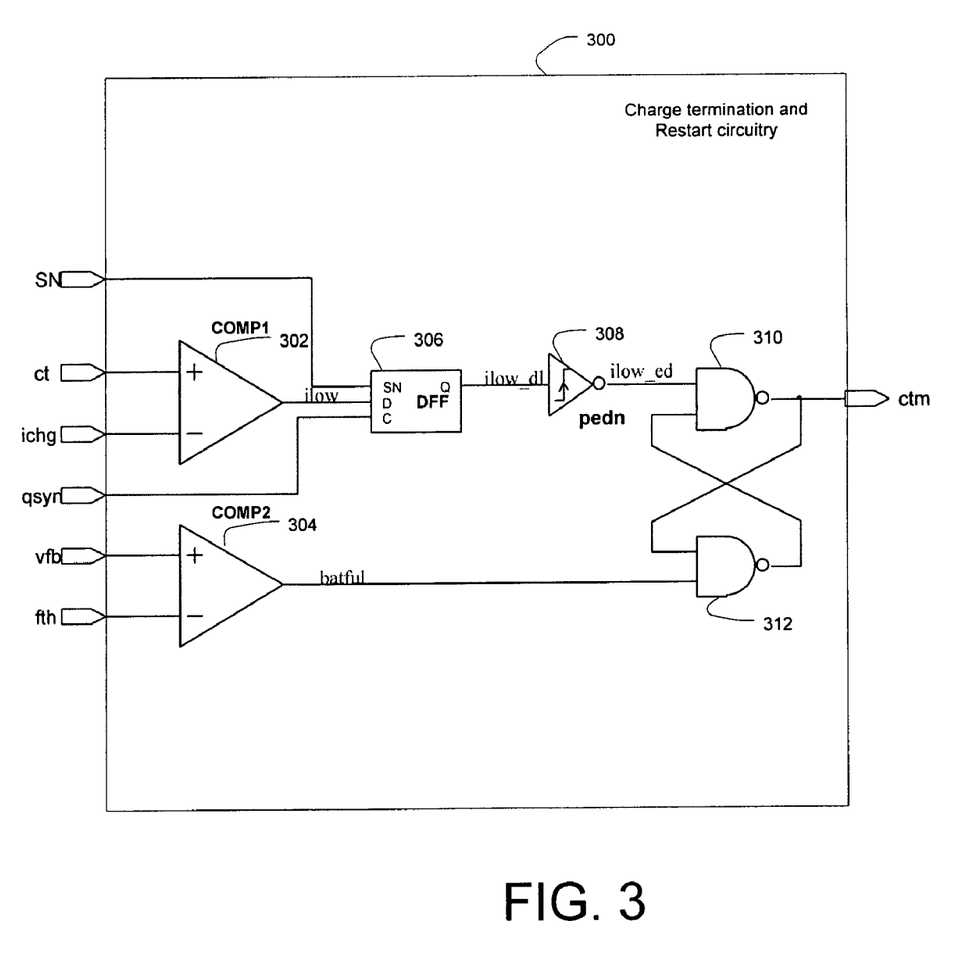
FIG. 3 is a diagram of an embodiment of the charge termination and restart circuitry of FIG. 1.

FIG. 3 illustrates an embodiment of the charge termination and restart circuitry 300 of FIG. 1. As used in any embodiment herein, "circuitry" may comprise, for example, singly or in any combination, hardwired circuitry, programmable circuitry, state machine circuitry, and/or firmware that stores instructions executed by programmable circuitry. In general, the charge termination and restart circuitry 300 may control the start, termination, and the restart of the charging process for the rechargeable battery 108 in response to various conditions. The charge termination and restart circuitry 300 may provide a "ctm" output signal. In one embodiment as illustrated in FIG. 1, the "ctm" signal may be provided to the control or gate terminal of the NMOS transistor Q2. The drain of the NMOS transistor Q2 may be coupled to "ctr" and the source may be coupled to ground so that when the "ctm" signal is a digital one, the NMOS transistor Q2 will turn ON and pull "ctr" down to zero to effectively terminate the charging process.

The charge termination and restart circuitry 300 may include comparators 302 and 304, a flip flop 306, a positive edge detector 308, and NAND gates 310 and 312. The comparator 302 may receive a "ct" signal at its noninverting input terminal and an "ichg" signal at its inverting input terminal representative of the charging current provided to the rechargeable battery 108. The comparator 302 may provide an output "ilow" signal in response to comparison of the "ct" and "ichg" signal such that "ilow" may be a digital zero if "ichg" is greater than "ct" and "ilow" may be a digital one if "ichg" is less than "ct." The comparator 304 may receive the "vfb" signal at its noninverting input terminal representative of the battery voltage level as provided by the feedback resistor network 144 of FIG. 1. The comparator 304 may also receive the "fth" signal at its inverting input terminal representative of a full voltage threshold for the battery 108. The comparator 304 may provide an output "batful" signal in response to comparison of the "vfb" and "fth" signal such that "batful" may be a digital zero if "fth" is greater than "vfb" and "batful" may be a digital one if "fth" is less than "vfb." The flip flop 306 may receive a periodic signal "qysn" at its clock input, another signal "SN" at its SN input, and the "ilow" signal output from the comparator 302 at its "D" input.

In operation, the charge termination and restart circuitry 300 may begin charging when the adapter voltage level of the adapter 104 is greater than the battery voltage level of the battery 108, may terminate charging when the charging current decreases to a certain threshold, and may restart charging when the battery voltage decreases a particular level from the full battery voltage, e.g., when the battery voltage decreases 100 mV/cell from the full battery voltage. When charging starts, "ichg" increases from zero. When "ichg" becomes greater then "ct" as those two signals are compared by comparator 302, the output of the comparator 302 is an "ilow" signal with a falling edge. As charging progresses and the battery is almost full, "ichg" will decrease and "ilow" will have a rising edge after a delay of a particular time interval which may be determined by the periodic signal "qysn". The output "ilow_dl" of the flip flop 306 will also have a rising edge which will be detected by the positive edge detector 308 and latched to the "ctm" signal which determines a charge termination. The "ctm" signal remains high until "Vfb"<"fth" which means the battery is no longer full. The flip flop 306 may be utilized to filter out a pulse of "ichg" which could trigger a false charge termination.

Figure 4:
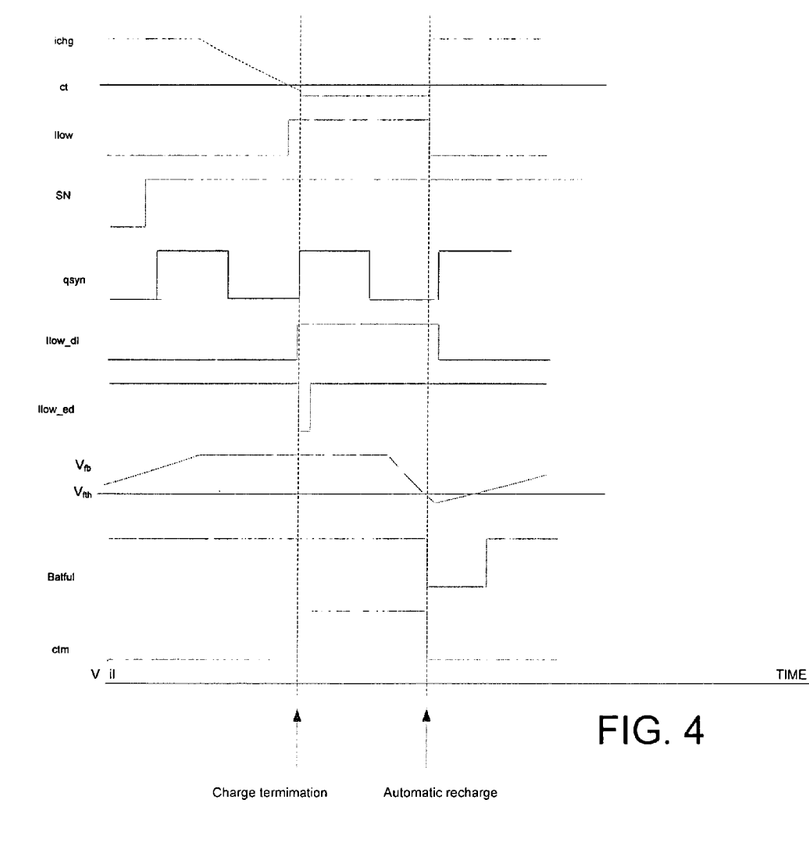
FIG. 4 is a timing diagram illustrating the operation of the termination and restart circuitry of FIG. 3.

FIG. 4 is a timing diagram of various signals input to, utilized in, and provided by the charge termination and restart circuitry 300 to further detail operation of the circuitry 300 of FIG. 3. For instance, the "ichg" and "ct" signals may represent those signals input to the comparator 302 while the "ilow" signal may represent the output of the comparator 302. The "ilow," "SN" and "qsyn" signals may represent those signals input to the flip flop 306, and the "ilow_dl" may represent that signal output from the flip flop 306. The "ilow_ed" signal may represent that signal output the positive edge detector 308. The "Vfb" and "Vfth" signals may represent those signal input to the comparator 304 while the "batful" signal may represent the output of the comparator 304. Finally, "ctm" may represent the output of the charge termination and restart circuitry 300.

Figure 5:
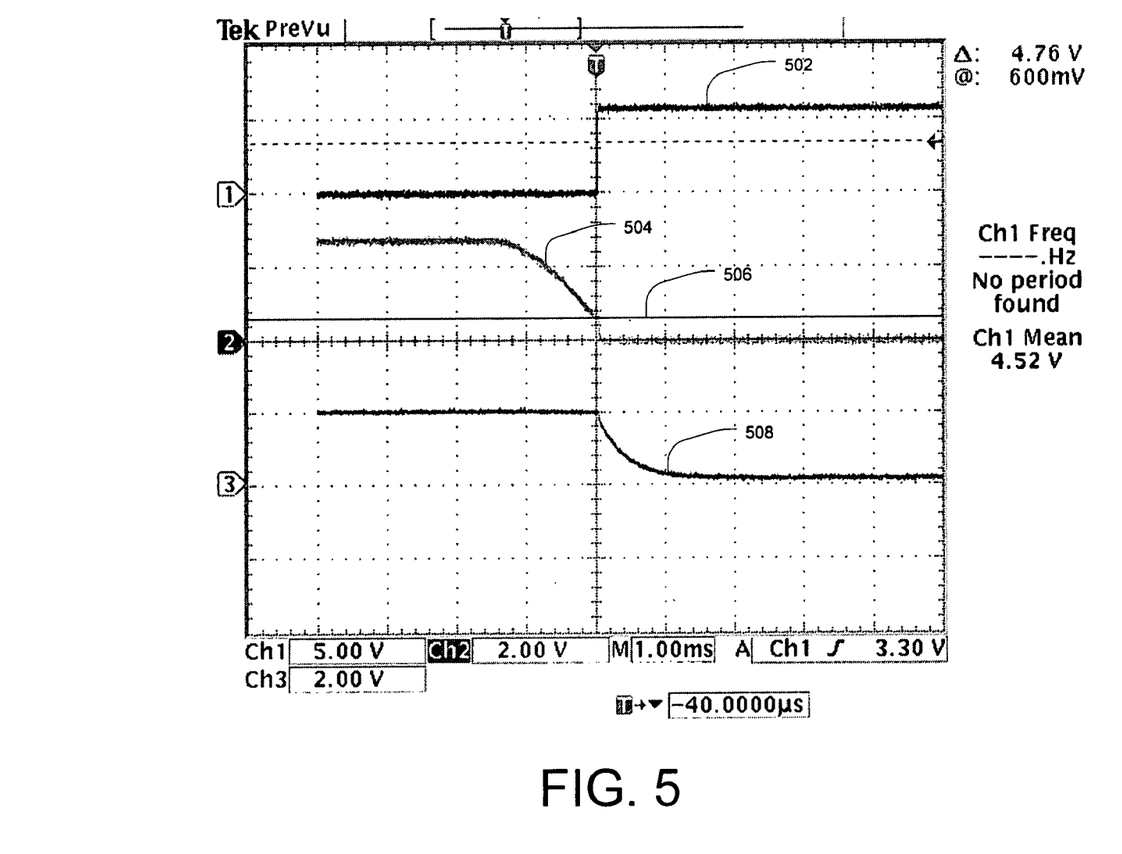
FIG. 5 illustrates plots of simulation test results for the charge termination and restart circuitry of FIG. 3.

FIG. 5 illustrates plots of simulation test results for the charge termination and restart circuitry 300 of FIG. 3. Plot 502 represents "ctm." Plot 504 represents "ichg." Plot 506 represent "ct" set to 0.6 volts. Finally, plot 508 represents "ctr." As illustrated, when "ichg" represented by plot 504 decreases to 0.6 volts, "ctm" represented by plot 502 turns to a digital one and the "ctr" signal which is input to the comparator 136 of FIG. 1 turns to a digital zero. Thus the "hdr" control signal output by the current mode charger controller 102 goes to a digital one and the high side switch Q1 is turned OFF to terminate the charging procedure.

Advantageously, a current mode charger controller with an internal compensation network is provided. The internal compensation network eliminates the need for any external compensation. Therefore, no additional pins and external compensation components with their associated costs and interconnection issues are necessary.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible.

What is claimed is:

1. An integrated circuit (IC) for controlling a DC to DC converter, said (IC) comprising:
   a current source configured to generate a current source signal, said current source signal is received at a common node;
   a first error amplifier configured to compare a first signal representative of a charging current provided to a rechargeable battery with a maximum charging current and provide a current control signal received at said common node in response to said comparison;
   an internal compensation network, internal to said IC, comprising a compensation capacitor coupled in series with a compensation resistor, said internal compensation network is coupled to said common node; wherein said current source is configured to charge said compensation capacitor an generate a compensation signal at said common node, said compensation signal is proportional to the voltage of said compensation capacitor; and wherein, if said first signal representative of a charging current provided to a rechargeable battery exceeds said maximum charging current, said current control signal sinks said current source signal and reduces said compensation signal; and
   a comparator configured to compare an inductor current signal representative of an inductor current through an inductor of said DC to DC converter with said compensation signal, wherein a reduction in said compensation signal results in a control signal provided by said current mode battery charger controller to reduce a charging current from said DC to DC controller.

2. The IC of claim 1, wherein said compensation capacitor is less than or equal to 40 picofarads and said compensation resistor coupled is less than or equal to 80 kiloohms.

3. The IC of claim 1, further comprising:
   a second error amplifier having an output coupled to said common node, said second error amplifier configured to compare a second signal representative of a battery voltage with a maximum battery voltage and provide a voltage control signal in response to said comparison, and wherein said compensation signal is reduced by said voltage control signal if said battery voltage is greater than said maximum battery voltage; and
   a third error amplifier having an output coupled to said common node, said third error amplifier configured to compare a third signal representative of an adapter current with a maximum adapter current and provide a power control signal in response to said comparison, wherein said compensation signal is reduced by said power control signal if said charging voltage level is greater than said maximum charging voltage, and wherein said compensation signal is reduced by said power control signal if said adapter current is greater than said maximum adapter current.

4. The IC of claim 1, further comprising charge termination and restart circuitry, said charge termination and restart circuitry configured to terminate said charging current provided to said rechargeable battery if said charging current decreases to a charge termination threshold.

5. A portable electrical device comprising:
a DC to DC converter configured to accept an input DC voltage from an adapter and provide an output DC voltage and charging current to a rechargeable battery, said DC to DC converter comprising an inductor;
an integrated circuit (IC) for controlling a DC to DC converter, said (IC) comprising:
a current source configured to generate a current source signal, said current source signal is received at a common node;
a first error amplifier configured to compare a first signal representative of a charging current provided to a rechargeable battery with a maximum charging current and provide a current control signal received at said common node in response to said comparison;
an internal compensation network, internal to said IC, comprising a compensation capacitor coupled in series with a compensation resistor, said internal compensation network is coupled to said common node; wherein said current source is configured to charge said compensation capacitor an generate a compensation signal at said common node, said compensation signal is proportional to the voltage of said compensation capacitor; and wherein, if said first signal representative of a charging current provided to a rechargeable battery exceeds said maximum charging current, said current control signal sinks said current source signal and reduces said compensation signal; and a comparator configured to compare an inductor current signal representative of an inductor current through an inductor of said DC to DC converter with said compensation signal, wherein a reduction in said compensation signal results in a control signal provided by said current mode battery charger controller to reduce a charging current from said DC to DC converter.

6. The portable electrical device of claim 5, wherein said compensation capacitor is less than or equal to 40 picofarads and said compensation resistor coupled is less than or equal to 80 kiloohms.

7. The portable electrical device of claim 5, wherein said IC further comprises:
a second error amplifier having an output coupled to said common node, said second error amplifier configured to compare a second signal representative of a battery voltage with a maximum battery voltage and provide a voltage control signal in response to said comparison, and wherein said compensation signal is reduced by said voltage control signal if said battery voltage is greater than said maximum battery voltage; and
a third error amplifier having an output coupled to said common node, said third error amplifier configured to compare a third signal representative of an adapter current with a maximum adapter current and provide a power control signal in response to said comparison, wherein said compensation signal is reduced by said voltage control signal if said charging voltage level is greater than said maximum charging voltage, and wherein said compensation signal is reduced by said power control signal if said adapter current is greater than said maximum adapter current.

8. The portable electrical device of claim 5, wherein said wherein said IC further comprises comprising charge termination and restart circuitry, said charge termination and restart circuitry configured to terminate said charging current provided to said rechargeable battery if said charging current decreases to a charge termination threshold.

* * * * *